US009913217B2

(12) United States Patent
Cariou et al.

(10) Patent No.: US 9,913,217 B2
(45) Date of Patent: Mar. 6, 2018

(54) TRANSMISSION FEEDBACK MECHANISM FOR POLLING WIRELESS DEVICES

(71) Applicant: Intel IP Corporation, Santa Clara, CA (US)

(72) Inventors: Laurent Cariou, Portland, OR (US); Chittabrata Ghosh, Fremont, CA (US); Robert Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 218 days.

(21) Appl. No.: 14/757,969

(22) Filed: Dec. 26, 2015

(65) Prior Publication Data

US 2017/0013607 A1    Jan. 12, 2017

Related U.S. Application Data

(60) Provisional application No. 62/189,596, filed on Jul. 7, 2015.

(51) Int. Cl.
*H04B 7/26* (2006.01)
*H04J 11/00* (2006.01)
*H04L 5/00* (2006.01)
*H04W 28/02* (2009.01)
*H04W 52/02* (2009.01)
(Continued)

(52) U.S. Cl.
CPC ...... *H04W 52/0225* (2013.01); *H04B 7/2603* (2013.01); *H04L 5/0026* (2013.01); *H04W 28/0278* (2013.01); *H04W 72/1263* (2013.01); *H04W 74/004* (2013.01); *H04W 74/06* (2013.01); *H04W 76/021* (2013.01); *H04J 2011/0003* (2013.01); *H04L 5/00* (2013.01); *H04W 88/02* (2013.01); *H04W 88/08* (2013.01); *H04W 92/10* (2013.01); *Y02B 60/50* (2013.01)

(58) Field of Classification Search
CPC ....... H04B 7/0658–7/0663; H04B 7/12; H04B 7/2603; H04J 2011/0003–2011/002; H04L 1/14–1/1692; H04L 5/0003–5/0026; H04W 28/02–28/0221; H04W 28/0278–28/0289; H04W 52/02–52/60; H04W 72/1263–72/14; H04W 74/02–74/06; H04W 76/021; H04W 88/02; H04W 88/08; H04W 92/10; Y02B 60/50
See application file for complete search history.

(56) References Cited

U.S. PATENT DOCUMENTS

| | | | |
|---|---|---|---|
| 2015/0016325 A1* | 1/2015 | Yang | H04W 52/0216 370/311 |
| 2016/0127233 A1* | 5/2016 | Wentink | H04W 72/1289 370/392 |

* cited by examiner

*Primary Examiner* — Timothy J Weidner
(74) *Attorney, Agent, or Firm* — Eversheds Sutherland (US) LLP

(57) ABSTRACT

This disclosure describes methods, devices, and systems related to generate a trigger frame including one or more resource block identifications (RBIDs), each RBID being associated with a respective resource unit of one or more resource units on a communication channel; cause to transmit the first trigger frame to each of one or more devices; process a received power save poll (PS-poll) bit from a first device of the one or more devices on a spatial stream and a first resource unit of the one or more resource units; cause to transmit an acknowledgment to each of the one or more user devices; cause to transmit data buffered in the at least one processor to the first device; and process a received acknowledgment from the first device confirming receipt of the data.

20 Claims, 8 Drawing Sheets

(51) Int. Cl.
*H04W 72/12* (2009.01)
*H04W 74/06* (2009.01)
*H04W 76/02* (2009.01)
*H04W 88/02* (2009.01)
*H04W 88/08* (2009.01)
*H04W 92/10* (2009.01)
*H04W 74/00* (2009.01)

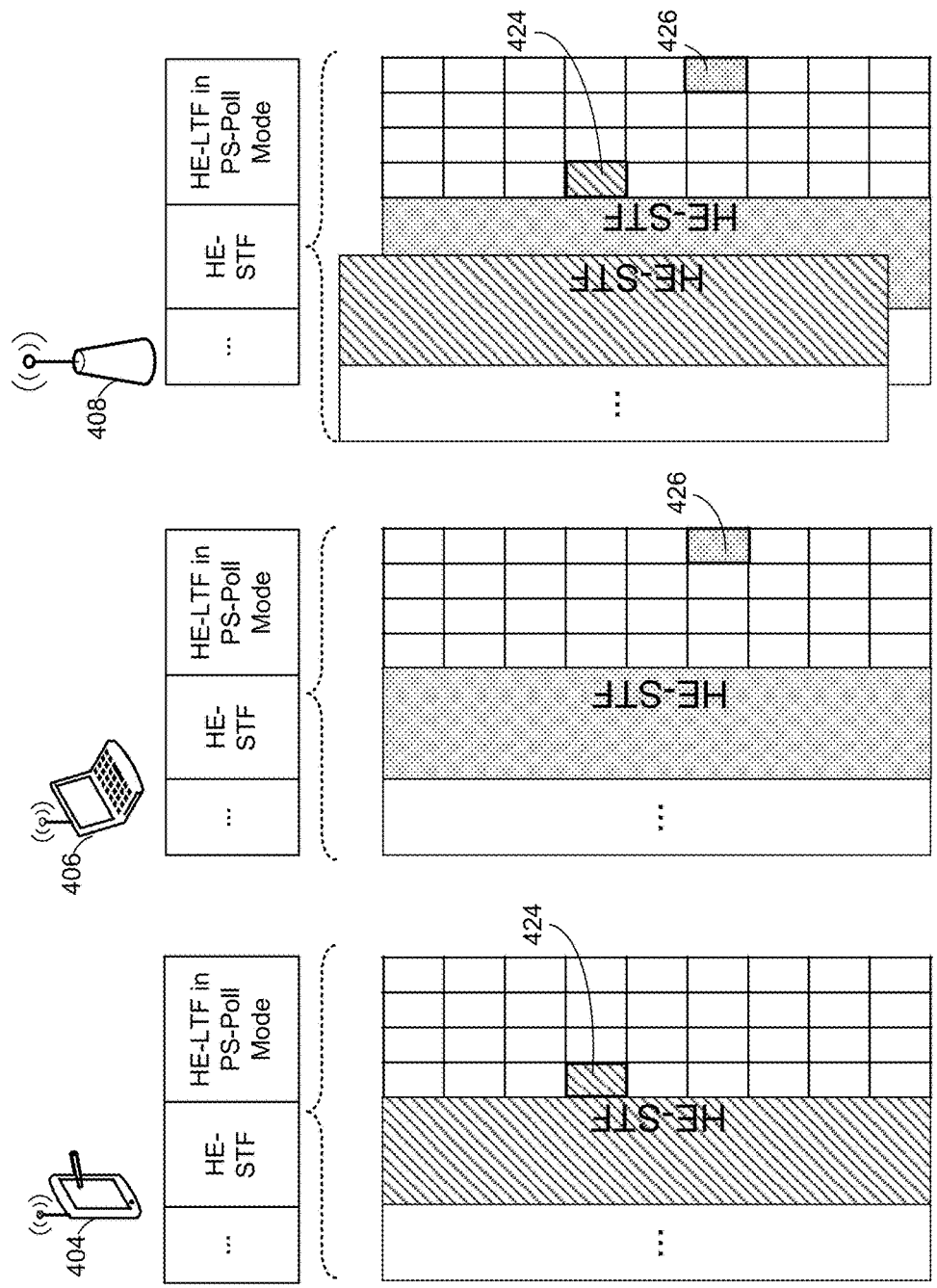

TRANSMISSION FEEDBACK MECHANISM FOR POLLING WIRELESS DEVICES

CROSS-REFERENCE TO RELATED APPLICATIONS

This application claims the benefit of U.S. Provisional Application No. 62/189,596 filed Jul. 7, 2015 the disclosure of which is incorporated herein by reference as if set forth in full.

TECHNICAL FIELD

This disclosure generally relates to systems and methods for wireless communications and, more particularly, to orthogonal frequency division multiple access polling feedback mechanisms for wireless devices.

BACKGROUND

Under development is a new Institute of Electrical and Electronics Engineers (IEEE) 802.11 ax standard, known as high efficiency wireless local area network (HEW) that is aimed to enhance Wi-Fi performance in indoor and outdoor scenarios. New HEW features are introduced to improve the spectral efficiency and user-throughputs of Wi-Fi in dense deployments. These will involve changes to the physical (PHY) and medium access control (MAC) layers.

BRIEF DESCRIPTION OF THE DRAWINGS

FIG. 4 depicts an illustrative transmission and reception of a PS-poll bit from a wireless station to an access point, in accordance with the one or more embodiments of the disclosure.

DETAILED DESCRIPTION

Figure 1:
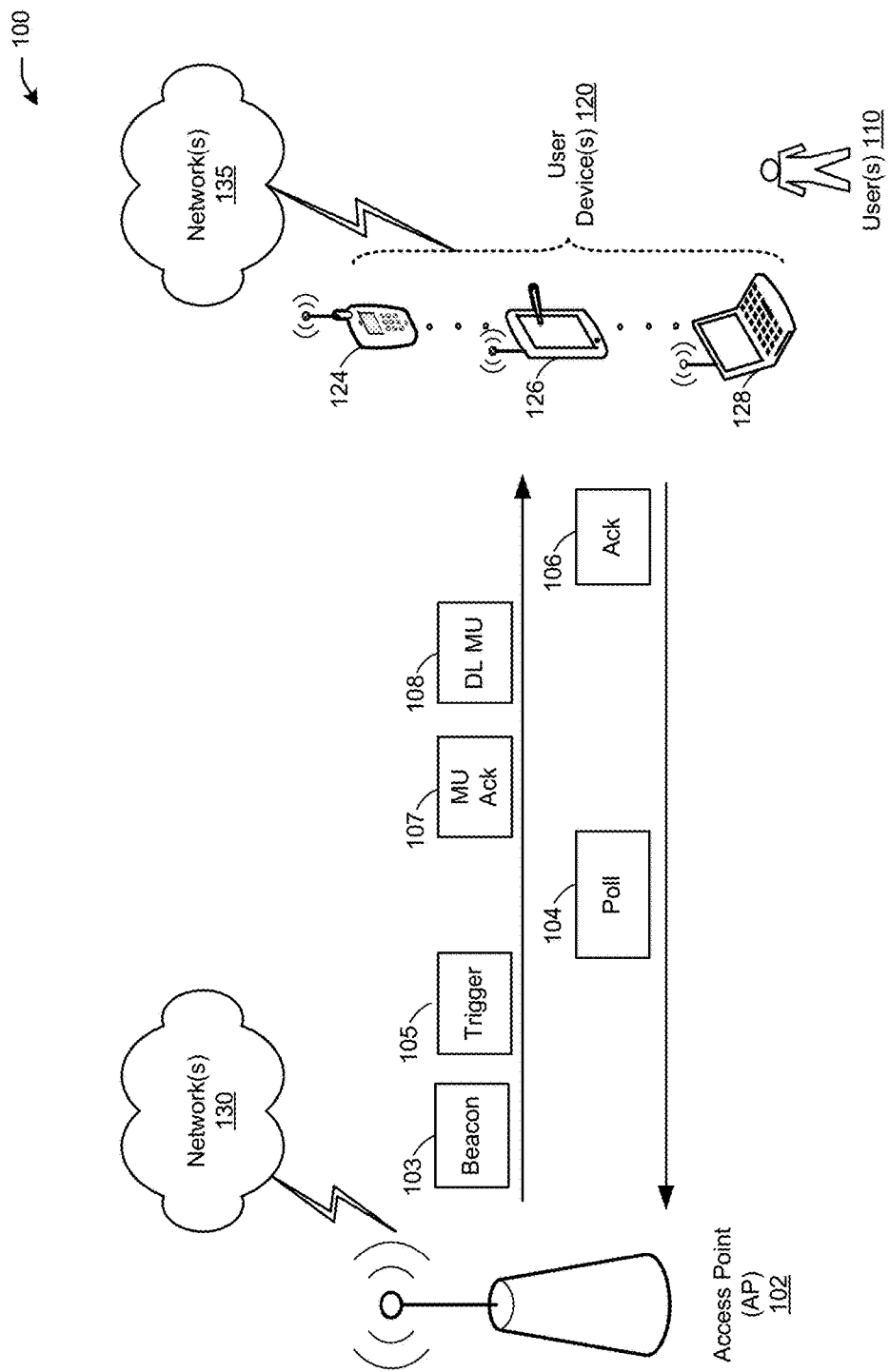
FIG. 1 depicts a network diagram illustrating an example network environment of an illustrative orthogonal frequency division multiple access (OFDMA) uplink power save poll (PS-poll) exchange for polling wireless stations, in accordance with the one or more embodiments of the disclosure.

Example embodiments described herein provide certain systems, methods, and devices, for providing a framework for flexible connectivity between wireless devices.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A design target for HEW is to adopt methods to improve the efficiency of Wi-Fi, and specifically the efficiency in dense deployments of Wi-Fi devices, such as in malls, conference halls, etc. HEW may use OFDMA techniques for channel access in the uplink and downlink directions. It is understood that the uplink direction is from a user device to an access point (AP), and the downlink direction is from an AP to one or more user devices. In the uplink direction, one or more user devices may be communicating with the AP and may be competing for channel access in a random channel access manner. In that case, the channel access in OFDMA may require coordination among the various user devices that may be competing to access the operating channel simultaneously. A trigger frame may consist of a preamble along with other signaling, such as resource allocation, to coordinate the uplink OFDMA operation. A trigger frame may be a frame that contains a preamble and other fields that may be sent from an AP informing all user devices serviced by the AP that channel access is available.

With OFDMA, the AP may transmit a trigger frame for various reasons, such as for allocating resources. User devices may use the allocated resource (e.g., 2 MHz of spectrum in a particular portion of the channel) to transmit their data back to the AP. Therefore, with this approach, the user devices may only transmit a narrow bandwidth signal in response to a trigger frame. However, the AP may not know which user devices or how many user devices have data to send.

Example embodiments of the present disclosure relate to systems, methods, and devices for an OFDMA uplink resource allocation framework that may enable two-phase uplink multiuser transmissions (UL MUs) that include a resource request phase and a data transmission phase. The resource request phase may be triggered by the AP, where the AP may ask user devices to send a specific signal(s) within an uplink OFDMA signal if they want to have a transmit opportunity in the data transmission phase or in future UL MU transmissions. A transmission period may be defined by a duration of transmission opportunity (TXOP), which may be a bounded time interval during which a user device 120 may send as many frames as possible (as long as the duration of the transmissions does not extend beyond the maximum duration of the TXOP). The characteristics of the signal sent by the user devices may enable the AP to identify the user devices. For example, the AP may be able to determine if any of the user devices are associated with the AP or if any of the user devices are an unassociated user device. An associated device is a device that is known to the AP and an unassociated device is a user device that is unknown to the AP. For example, a user device may send a code sequence in the high efficiency long training field (HE-LTF) of a PHY preamble. The code may be sent on a resource unit in frequency. This combination of a code sequence and frequency resource unit may have an ID, which may be referred to as a resource block ID (RBID). The AP may detect the energy of the code sequence and frequency unit (e.g., RBID), which enables the AP to know the identity of the user device sending the code sequence. The AP may acknowledge to the user devices that it received the resource requests. The second phase may start with a trigger frame sent by the AP, announcing the identity of the user devices that could transmit their uplink data, and other information like the allocated resources.

The illustrative wireless network 100 of FIG. 1 may include one or more AP(s) 102 that communicate with one or more user device(s) 120, in accordance with IEEE 802.11 communication standards, including IEEE 802.11 ax. The one or more user device(s) 120 and the one or more APs 102 may be devices that are non-stationary without fixed locations or may be stationary with fixed locations.

Figure 6:
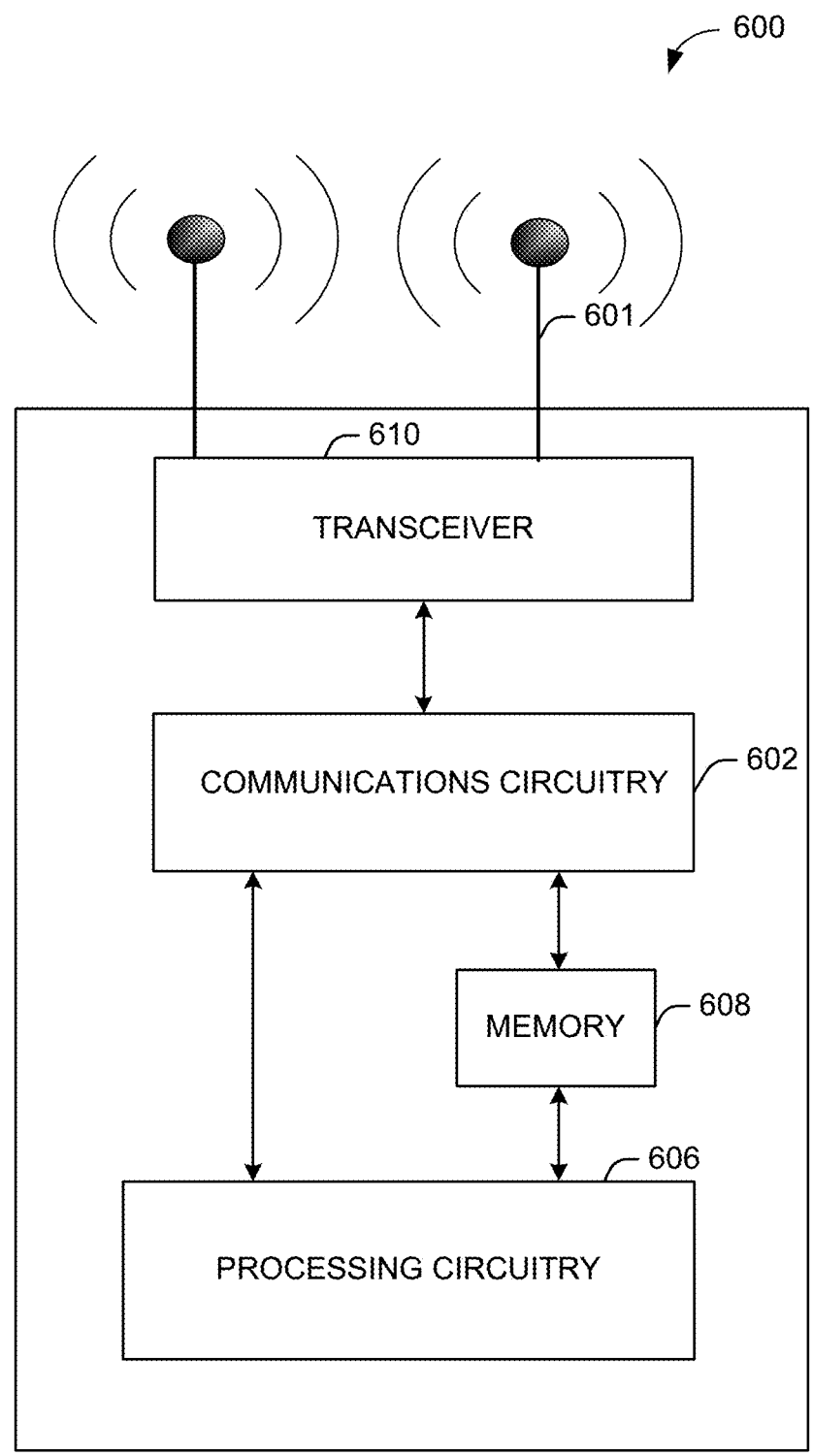
FIG. 6 illustrates a functional diagram of an example communication station that may be suitable for use as a user device, in accordance with one or more example embodiments of the disclosure.
Figure 7:
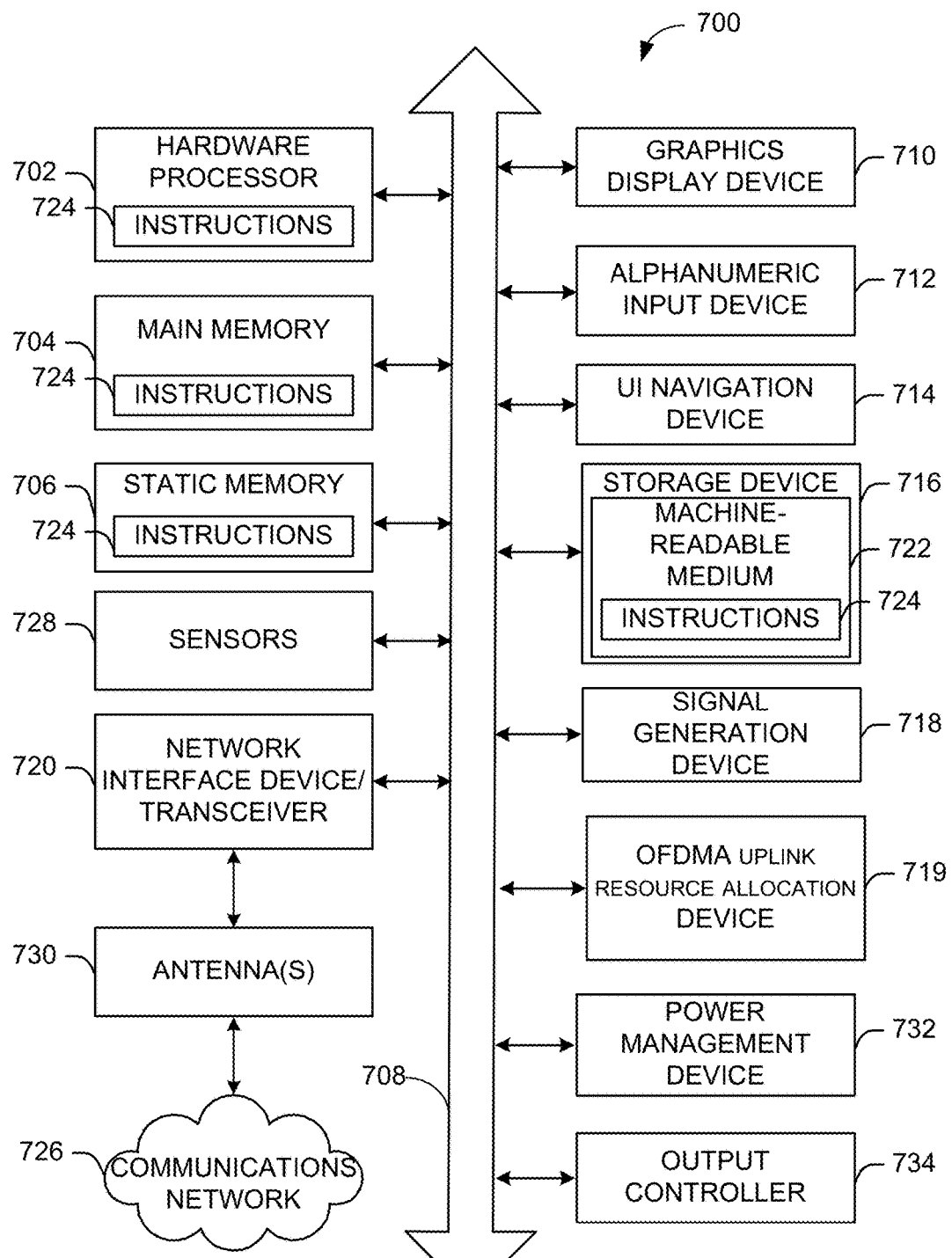
FIG. 7 is a block diagram of an example machine upon which any of one or more techniques (e.g., methods) may be performed, in accordance with one or more embodiments of the disclosure.

In some embodiments, the user device(s) 120 and AP 102 can include one or more computer systems similar to that of the functional diagram of FIG. 6 and/or the example machine/system of FIG. 7.

One or more illustrative user device(s) 120 may be operable by one or more users) 110. The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless devices (e.g., bracelet, watch, glasses, ring, etc.) and so forth.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. Communications antenna may be any suitable type of antenna corresponding to the communications protocols used by the user device(s) 120 (e.g., user devices 124, 126 and 128), and AP 102. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, and/or 128), the AP may communicate in the downlink direction by sending data frames. When the user devices communicate with the AP, the user devices may communicate in the uplink direction. For example, the AP may send a beacon frame 103 followed by a trigger frame 105 to the one or more user devices 120. The trigger frame 105 may contain a preamble that may be part of a physical layer (PHY) header or a MAC layer header. The preamble may be used to allow the user device to detect a new incoming data frame from the AP. A preamble may be a signal used in network communications to synchronize transmission timing between two or more devices (e.g., between the APs and user devices).

Referring to FIG. 1, there is shown a network diagram illustrating an example wireless network 100 for an OFDMA power save poll (PS-poll) exchange for polling wireless stations, according to some example embodiments of the disclosure. In this environment, user devices 120, including HEW user devices, may communicate with AP 102, and transmit data on an operating channel. In order to transmit data on the operating channel, the user devices may use resource units that may be allocated for data transmission. The user device(s) 120 may be assigned one or more resource units or may randomly access the operating channel. It is understood that a resource unit may be a bandwidth allocation on an operating channel in time and/or frequency domain. For example, with respect to the AP assigning resource units, in a frequency band of 20 MHz, there may be a total of 9 resource units, each of the size of a basic resource unit of 26 frequency tones. The AP 102 may assign one or more of these resource units to one or more user device(s) 120 to transmit their uplink data. It is understood that the frequency band, the number of resource units, and frequency tones may be different.

Trigger frame 105 may contain information related to resource allocation. For example, trigger frame 105 may contain RBIDs allocated by AP 102. RBIDs may be assigned to one or more user devices prior to the resource request phase. For instance, an RBID may be assigned during association between AP 102 and any of the user devices 120. The trigger frame 105 may carry some information to identify the set of RBIDs that may be used for random access and the RBIDs that are assigned to one or more user devices 120. If a user device 120 has an RBID that may be used for a resource request based on a previous assignment and based on the trigger frame information, the user device 120 may participate in the resource request phase.

AP 102 may assign one or more RBIDs to the one or more user devices that are associated with AP 102. For example, if AP 102 assigns RBID 1 to user device 124, user device 124 may utilize the resource block of the HE-LTF field corresponding to RBID 1. The resource block may be defined as a spatial stream and a resource unit in the frequency domain, wherein the spatial stream is a code sequence corresponding to a row of a P-matrix. This combination of a code sequence and frequency resource unit may have an ID, which may be referred to as a resource block ID (RBID). The HE-LTF may be part of a PHY preamble sent from user device 124 to AP 102.

When AP 102 receives poll 104, where RBID 1 is used, AP 102 may determine that the corresponding user device 124 is active and ready to receive any buffered data that may need to be sent to user device 124 (e.g., DL MU 108). Poll 104 may be a power save poll (PS-poll) sent to AP 102 from user device 124 indicating that it is not in a power save state and ready to receive any data that AP 102 may be buffering for user device 124. AP 102 may acknowledge to user device 124 and other user devices (e.g., user device 126 and 128) that it received the poll 104 in a multiuser acknowledgment frame (e.g., MU Ack 107). In some embodiments AP 102 may broadcast MU Ack 107 to all user devices including those user devices that did not transmit a poll. After sending MU Ack 107 to user devices 120, AP 102 may send buffered data for user devices 120 in a downlink multiuser frame (e.g., DL MU 108). The user devices that received data may respond by sending an acknowledgment frame (e.g., Ack 106).

Figure 2:
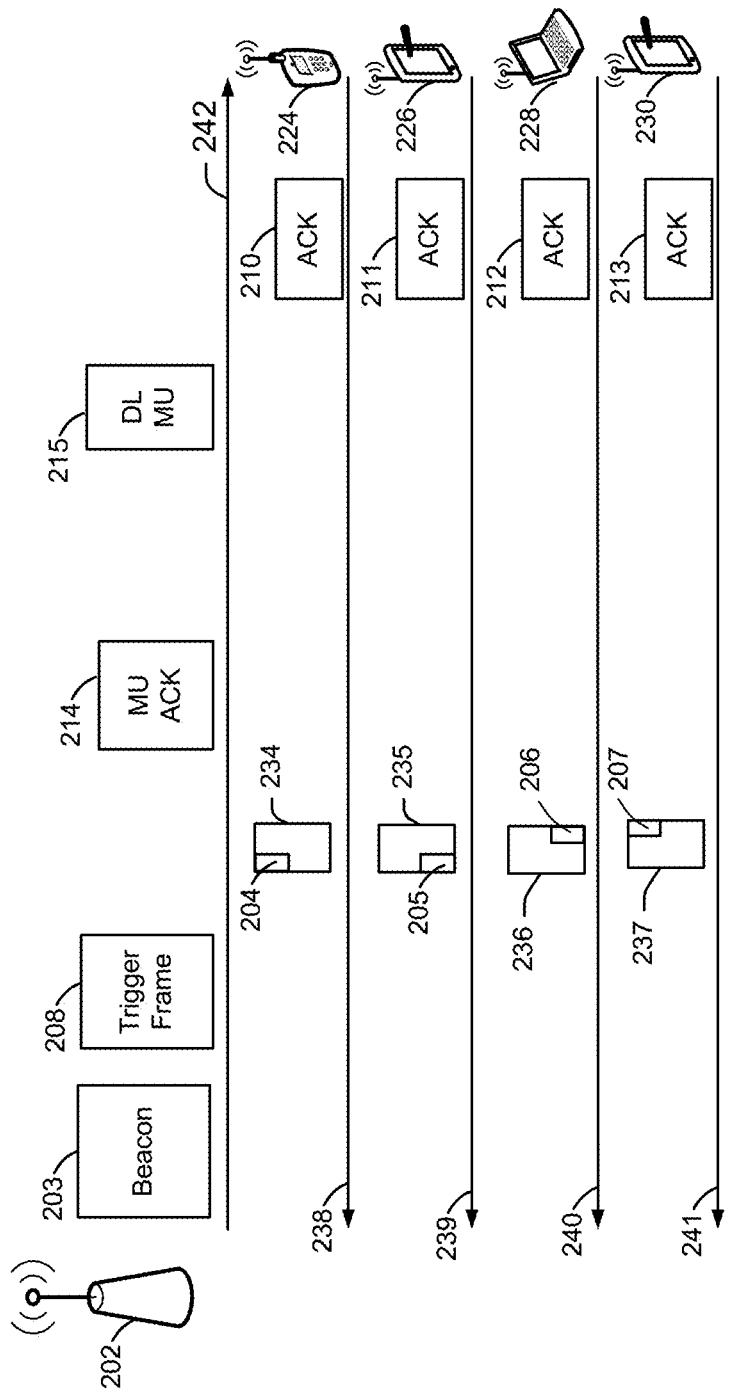
FIG. 2 depicts an illustrative schematic diagram of an OFDMA uplink (PS-poll) exchange for polling wireless stations, in accordance with the one or more embodiments of the disclosure.

FIG. 2 depicts an illustrative schematic diagram of resource allocation in an OFDMA uplink power save poll (PS-poll) exchange for polling wireless stations, in accordance with one or more example embodiments of the present disclosure. In this illustrative example, user devices 224 and 226 may be associated with AP 202 and user devices 228 and 230 may be unassociated with AP 202. AP 202 may send Beacon 203, Trigger Frame 208, MU ACK 214, and DL MU 215 on downlink communication channel 242 to user devices 224-230. AP 202 may receive RBIDs 234-237 and ACKs 210-213 on uplink communication channels 238-241 from user devices 224, 226, 228, and 230 respectively.

In one embodiment, AP 202 may send a beacon frame 203 followed by a trigger frame 208 to initiate transmission of a poll bit from both associated and unassociated devices. Trigger frame 208 may inquire whether user devices 224-230 are in a power save state. The user devices that are not in a power save state may send a PS-poll bit by sending energy on an assigned resource block corresponding to a RBID if the user device is an associated user device (e.g., user devices 224 and 226). However, if the user device is unassociated (e.g., user devices 228 and 230), the user device may utilize a random resource block to send energy, on a randomly selected resource block, corresponding to the PS-poll. For example, AP 202 may assign RBIDs to assigned user devices 224 and 226 in trigger frame 208. Additionally, trigger frame 208 may also contain unassigned resource blocks that unassociated user devices 228 and 230 may use to send their corresponding PS-poll bits. The AP 202 may detect energy on one or more resource blocks from a user device corresponding to a resource block indicating that the user device is not in a lower power state (e.g., RBID 234, 235, 236, 237). For example, AP 202 may detect energy on resource blocks 204 and 205 in the PHY preamble sent from user device 224 and user device 226 respectively. Additionally, AP 202 may detect energy on resource blocks 206 and 207. However, since user devices 228 and 230 are unassociated user devices, the AP may not be aware which user device is sending a PS-poll.

In one embodiment, AP 202 may assign resource units based on the RBID associated with the energy received on the corresponding resource block. For example, when user device 228 utilized resource block 206 to send a PS-poll, AP 202 may assign a resource unit and associate the resource unit with the RBID that the energy was detected on. As a result, user device 228 may determine that a resource unit is assigned to it based on the RBID. AP 202 may send a multiuser acknowledgment (e.g., MU ACK 214) to user devices 224-230 in response to RBID 234-236 as explained above with reference to FIG. 1. AP 202 may then send buffered data for any of user devices 224-230 to user devices 224-230. User devices 224-230 may in turn send acknowledgement frames (e.g., ACK 210-213) to AP 202 in response to receiving the buffered data. In some embodiments only some of the user devices may have buffered data waiting to be sent. The user devices may use the same RBs to send the acknowledgment frames as were used to send the PS-polls.

Figure 3:
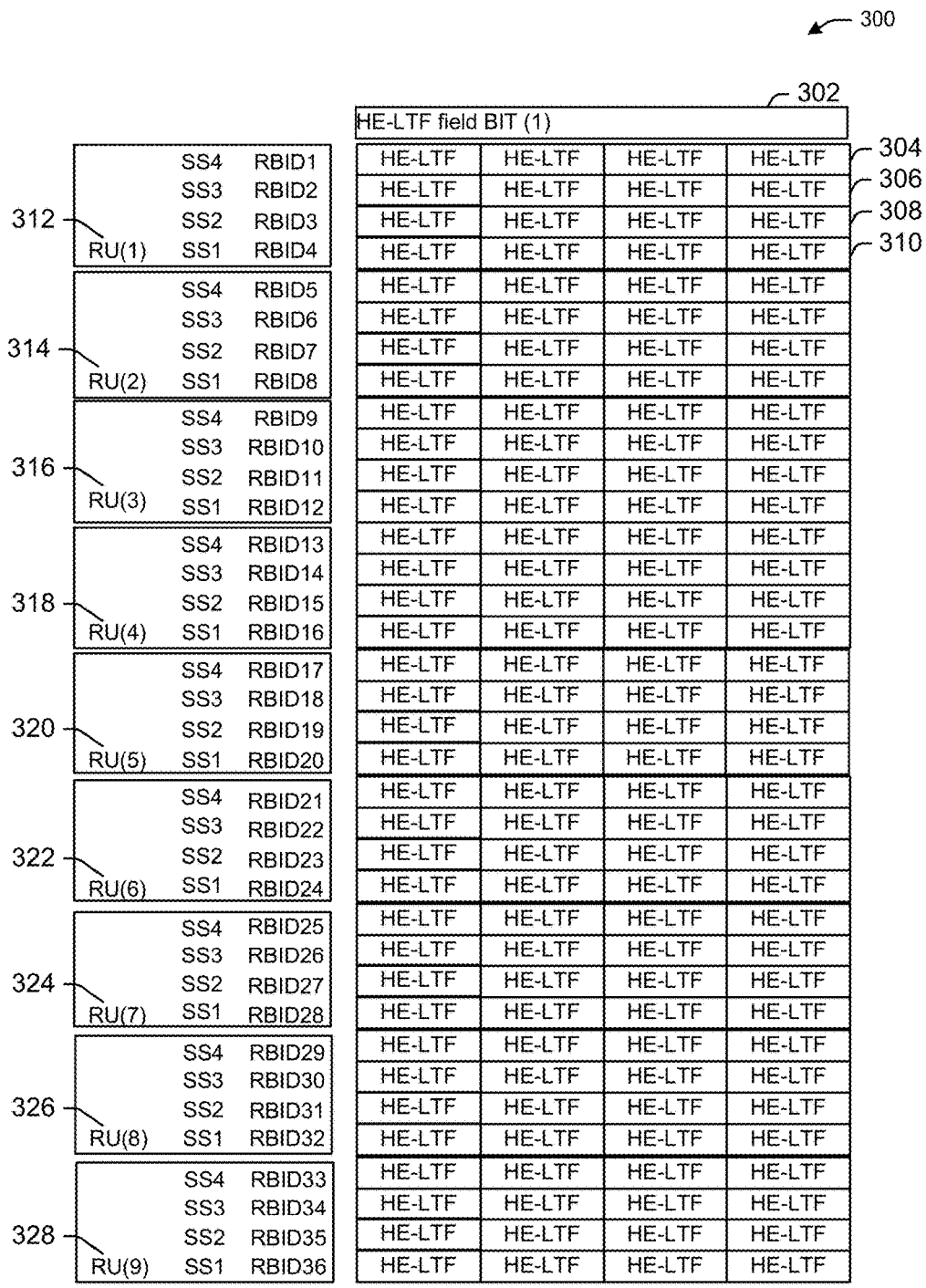
FIG. 3 depicts an illustrative schematic diagram of a resource block allocation, in accordance with the one or more embodiments of the disclosure.

FIG. 3 depicts an illustrative schematic diagram of a resource block allocation, in accordance with the one or more embodiments of the disclosure. The resource block allocation may be defined by the AP. A resource block may be defined as a spatial stream and a resource unit in the frequency domain, wherein the spatial stream is a code sequence corresponding to a row of a P-matrix. MIMO utilizes multiple antennas at both a transmitting device (e.g., an AP) and a receiving device (e.g., user devices 120) to help increase the throughput and transmit larger amounts of data over a wireless channel. MIMO employ a technique for using spatial streams, which are streams that transmit independently and separately encoded data signals from each of the multiple antennas. Additionally, MIMO utilizes a technique called spatial division multiplexing (SDM) that takes advantage of the multiple transmit and receive radio chains making it possible to send multiple streams of data simultaneously on the same channel, thereby increasing the data rate and overall throughput.

In one embodiment, a combination of a code sequence and frequency resource unit may define a resource block. In other words, a resource block may be an orthogonal frequency-code slot defined by a resource unit and a spatial stream. The HE-LTF may be part of a PHY preamble sent from user device 124 to AP 102. The AP may define a frequency-code grid 300, where the column may represent different code sequences, which may be lines of the P-matrix that may be used in a HE-LTF of a preamble. Generally, a P-matrix is a complex square matrix with every principle minor>0. A minor of a matrix A is generally a determinant of some smaller square matrix, obtained from A by removing one or more of its rows or columns. Minors obtained by removing just one row and one column from square matrices (first minors) are required for calculating matrix cofactors, which in turn are useful for computing both the determinant and inverse of square matrices. An orthogonal matrix such as the P-matrix may be applied to the training symbols for a given group of user devices, which may result in training symbols being separated and more easily distinguishable from one another. For example, the number of codes may be based on the number of rows in a P-matrix. In one example, there may be up to 8 codes. Further, frequency-code grid 300 may have rows representing resource units in the frequency domain (26 tones allocations for instance). The AP may define the number of columns (among other possible configurations) and the number of rows, which may be based on UL OFDMA designs, for example, 4 columns and 9 rows using a 20 MHz frequency band, or other values for columns and rows. In this example, 4 columns and 9 rows may result in 36 resource blocks. Each of the 9 rows may correspond to a resource unit (e.g., RU1-RU9), and each resource unit may be comprised of four different spatial streams. For each resource unit there exists a spatial stream which corresponds to a resource block. Each resource block may have an ID, which may be referred to as a resource block ID (RBID). For example RU(5) 320 may comprise 26 tones that may be used by one or more user devices sending data to an AP using one or more spatial streams (e.g., SS1-SS4) each of which may correspond to a different RBID (e.g., RBID17-RBID20). Each RBID may correspond to four of the same HE-LTFs. The HE-LTFs may contain lines from a 4×4 matrix as depicted in frequency-code grid 300. For example, row 304 may correspond to four of the same HE-LTFs each of which may contain a first line of the 4×4 P-matrix, row 306 may correspond to four of the same HE-LTFs each of which may contain a second line of the 4×4 P-matrix, row 308 may correspond to four of the same HE-LTFs each of which may contain a third line of the 4×4 P-matrix, and row 310 may correspond to four of the same HE-LTFs each of which may contain a fourth line of the P-matrix.

The four HE-LTFs may be sent by a user device in succession and enable the user device to encode data corresponding to the 1-bit field HE-LTF field BIT (1) 302 which may indicate whether the user device is in a lower power state or not. The transmission of the four HE-LTFs in time enable the user device to encode 1-bit of information per resource block, for up to 36 users each of which corresponds to an RBID. If the HE-LTFs are transmitted, the 1-bit field is equal to 1, and if they are not transmitted the 1-bit field is not equal to 1. All or some resource blocks may be randomly selected by user devices, all or some resource blocks may be assigned to associated user devices, or some resource blocks (e.g., blocks 304) may be assigned to associated user devices and some blocks (e.g., block 310) may be randomly selected by user devices.

FIG. 4 depicts an illustrative transmission and reception of a PS-poll bit from a wireless station to an access point, in accordance with the one or more embodiments of the disclosure. In one embodiment, one or more user devices that want to receive data from an AP in one or more downlink data frames, may send a PS-Poll bit corresponding to the encoding of four HE-LTFs that are sent in a preamble to indicate that it is not in a power save state and therefore is ready to receive data. An AP may have sent a trigger frame assigning RBIDs to various user devices or may have sent a trigger frame with unassigned RBIDs that may be used for random access. User devices that have assigned RBIDs in the trigger frame may use their RBIDs in order to notify the AP that they are not in a power save state and are ready to receive any buffered data the AP may have to transmit by sending a PS-Poll bit. The user devices that do not have assigned RBIDs may randomly select one of the unassigned RBIDs that were advertised in the trigger frame. As explained above, a user device may transmit a preamble that may contain one or more training fields. For example, user devices 404 and 406 may transmit at least an HE-STF frame on the bandwidth used by the trigger frame, followed by a HE-LTF frame, transmitted on the resource unit, and using a P-matrix code from the RBID corresponding to a spatial stream. Legacy preambles (L-STF, L-LTF, and L-SIG) may be sent prior to the HE-STF. In the example of FIG. 4, user device 404 may transmit energy using the first line of a 4×4 P-matrix, on the 4th resource unit in frequency (e.g., PS-Poll block 424). The corresponding RBID may be RBID16 which may correspond to RU(4) 318 and SS1 in RU(4) 318. SS1 in RU(4) 318 may correspond to the first line in the 4×4 P-matrix, and RU(4) 318 may correspond to the $4^{th}$ resource unit in frequency. In addition, user device 406 may transmit energy using the 4th line of the 4×4 P-Matrix, on the $6^{th}$ resource unit in frequency (e.g., PS-Poll block 426). The corresponding RBID may be RBID21 which may correspond to RU(6) 322 and SS4 in RU(6) 322. SS4 in RU(6) 322 may correspond to the fourth line in the 4×4 P-matrix, and RU(6) 322 may correspond to the $6^{th}$ resource unit in frequency. User devices 404 and 406 may send four HE-LTFs consecutively in order to encode a PS-Poll bit (e.g., HE-LTF field BIT (1) 302). For example, user device 404 may send the row of HE-LTFs corresponding to RBID 16 and user device 406 may send the row of HE-LTFs corresponding to RBID21. It is understood that the above is only one example of utilizing a P-matrix and resource unit combination in order to determine a resource block.

In one embodiment, AP 408 may receive the HE-STF and HE-LTF from user devices 404 and/or 406 in a combined format. When receiving each of the four HE-LTFs from each of user devices 404 and/or 406, AP 408 may detect energy (by correlation with the different sequences of the P-matrix in the different resource units) on one or more resource blocks. When AP 408 detects energy on the RBID assigned to a user device, AP 408 may determine which user device has sent a PS-Poll bit. When AP 408 detects energy on a resource block used for random access, it notes the resource block ID and uses this ID as the identifier for that user device.

Figure 5A:
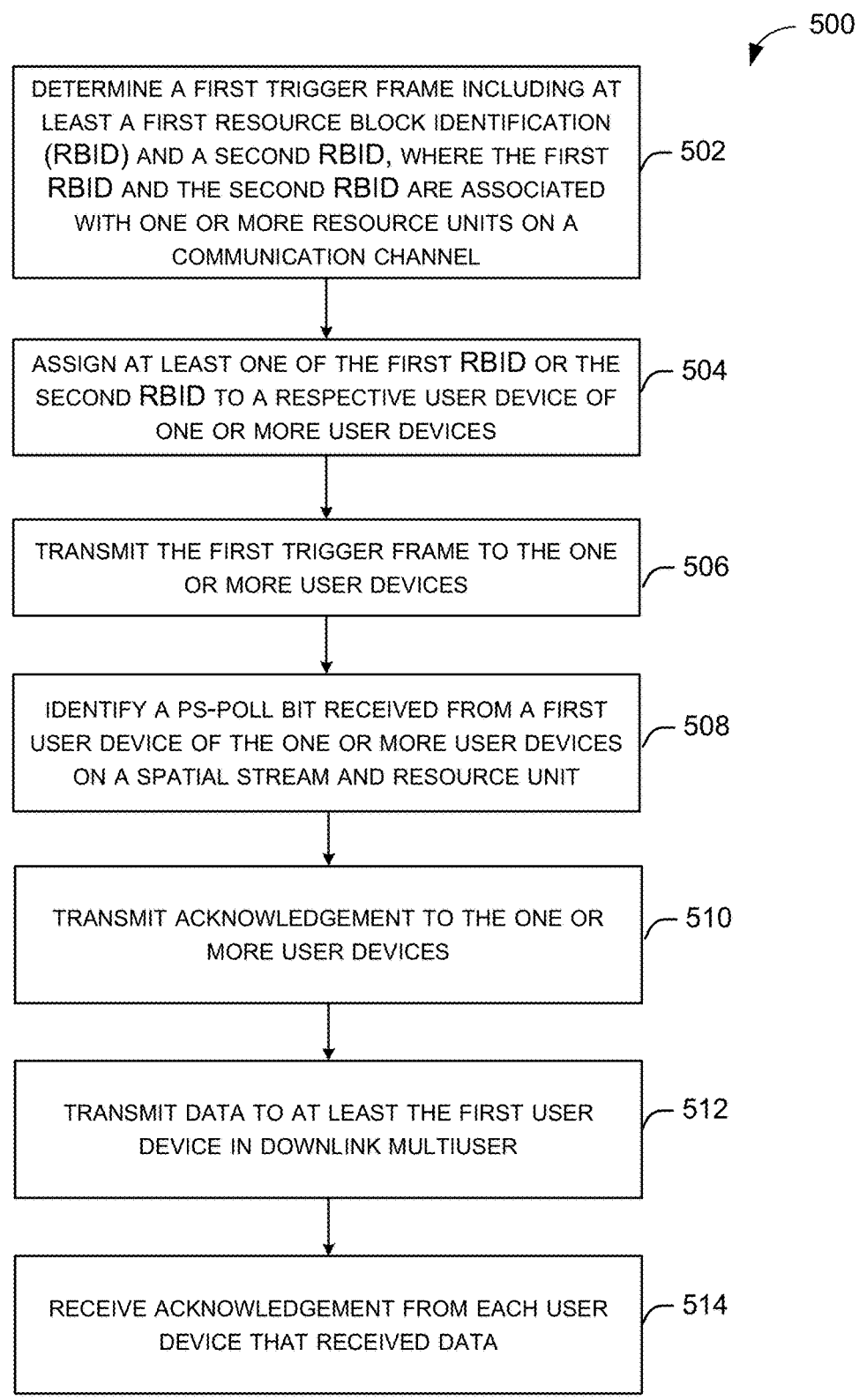
FIG. 5A depicts a flow diagram of an illustrative process for an illustrative OFDMA uplink PS-poll exchange, in accordance with one or more embodiments of the disclosure.

FIG. 5A depicts a flow diagram of an illustrative process 500 for an illustrative OFDMA uplink PS-poll exchange, in accordance with one or more embodiments of the disclosure.

At block 502, the AP may determine a first trigger frame including at least a first resource block identification (RBID) and a second RBID. The first and second RBID may be associated with one or more resource units on a communication channel. The trigger frame may include one or more resource block identifications (RBIDs) associated with one or more resource units on a communication channel. Using the trigger frame, the AP may invoke user devices to send a PS-poll bit within an uplink OFDMA signal if they want to retrieve buffered data in a MU DL frame (e.g., DL MU 215). The one or more resource blocks include a code sequence associated with a resource unit in a frequency domain as explained above with reference to FIGS. 3-4.

At block 504, the AP may assign each of the at least one of the first RBID or the second RBID to a respective user device of one or more user devices. Some of the user devices may be associated with the AP and other user devices may be unassociated with the AP. An associated device is a device that is known to the AP and an unassociated device is a user device that is unknown to the AP.

At block 506, the AP may send the first trigger frame to one or more user devices. Although the user devices may be associated or unassociated, the AP may send the trigger frame to all user devices. The user devices may be able to detect the trigger frame and make a decision on whether to respond by sending a PS-poll bit. If a user device is in a power save state, it may not send a PS-Poll bit to the AP. If the user device is not in a power save state, it may send a PS-Poll bit to the AP to indicate that it is available to receive any buffered data that the AP may have to send to it. The PS-Poll bit is an encoding of four of the same line (i.e., code) of a P-matrix each of which may be transmitted in a HE-LTF field on a RU from the user device. The code and RU may correspond to a RB and may be identified by a RBID. The HE-LTFs may each be transmitted in a corresponding PHY preamble. The HE-LTF field may include one or more resource blocks. A resource block may be defined as a spatial stream and a resource unit in the frequency domain, wherein the spatial stream is a code sequence corresponding to a row of a P-matrix. This combination of a code sequence and frequency resource unit may have an ID, which may be referred to as a resource block ID (RBID).

At block 508, the AP may identify a PS-Poll bit received from a first user device of the one or more user devices corresponding to a spatial stream and energy received on a resource unit. The AP may identify which user device sent the PS-Poll, if the user device is an assigned user device, by correlating the energy in the received RB with a code and RU. If a user device is unassigned, and the AP receives a PS-Poll on a RB from the unassigned user device, the AP may assign the RB to the user device.

At block 510, the AP may transmit an acknowledgement frame to the one or more user devices in a multiuser downlink DL frame (e.g., MU ACK 214). The acknowledgment frame may be sent to each of the user devices (i.e., broadcast the DL frame to all user devices that may be a part of a Basic Service Set (BSS) associated with the AP). The AP may determine that it is storing data for one or more of the user devices, and may send the data to at least the first user device in a downlink multiuser frame (e.g., DL MU 215) in block 512. After transmitting the data to the one or more users, the AP may receive an acknowledgment from each user device that received data (block 514). For example, user devices 226 and 230 may receive data from AP 202 and may send ACK 211 and ACK 213 respectively to AP 202.

Figure 5B:
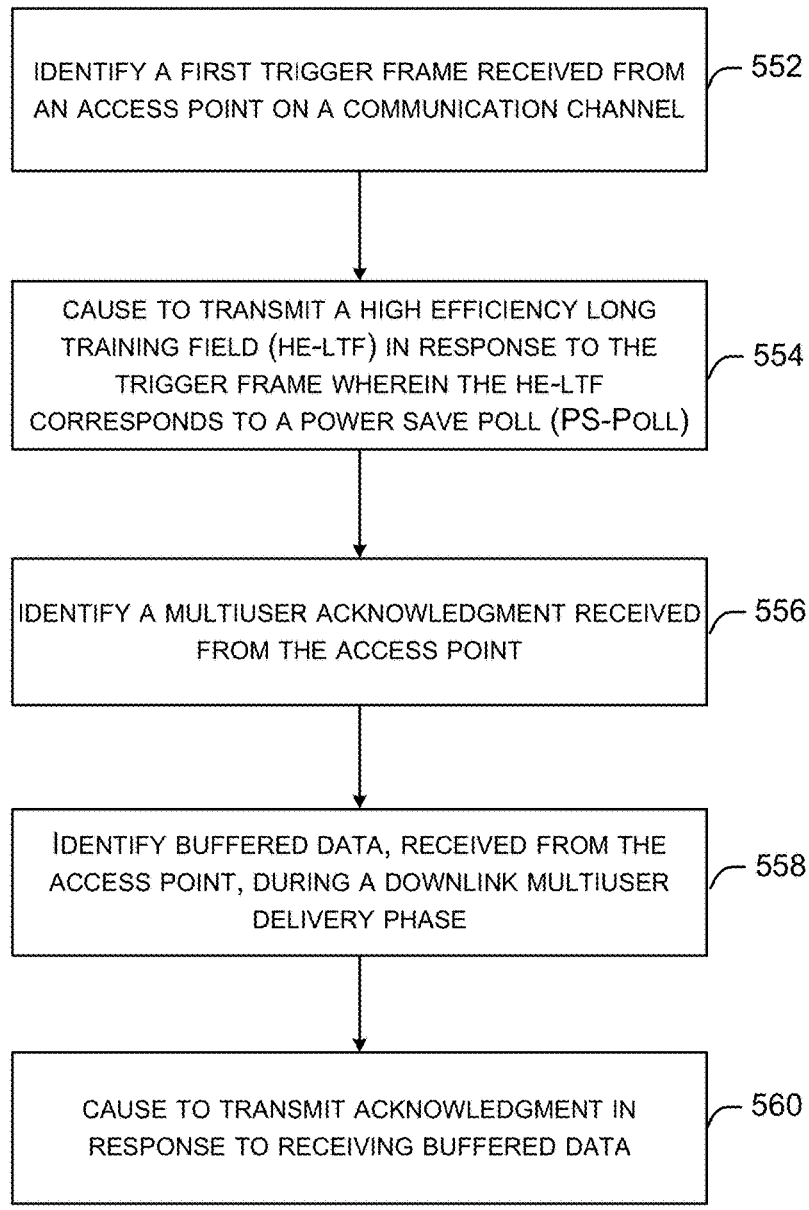
FIG. 5B depicts a flow diagram of an illustrative process for an illustrative OFDMA uplink PS-poll exchange, in accordance with one or more embodiments of the disclosure.

FIG. 5B depicts a flow diagram of an illustrative process 550 for an illustrative OFDMA PS-poll exchange, in accordance with one or more embodiments of the disclosure.

At block 552, a user device may identify a trigger frame received from an AP on a communication channel. The user device may be associated with the access point or unassociated with the access point. The AP may define and advertise, for example, using beacons, control frames, or in the trigger frame, the group of resource blocks that are assigned and/or the resource blocks that are for random selection.

At block 554, the user device may cause to send four HE-LTFs in response to the trigger frame to an AP. The four HE-LTFs may encode a 1-bit PS-Poll as explained above, to notify the AP that it is not in a power save state. In block 556 the user device may identify a multiuser acknowledgment (e.g., MU ACK 214) in a frame, received from an access point, in response to sending the four HE-LTFs. After receiving the multiuser acknowledgement the user device may identify buffered data, received from the AP, during a downlink multiuser frame (e.g., DL MU 215) delivery phase in block 558. The user device may in turn send an acknowledgment in response to receiving the data in block 560.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2, 3, 4, 5A and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 and arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the Communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), an OFDMA uplink resource allocation device 719, a network interface device/transceiver 720 coupled to antenna(s) 730, and one or more sensors 728, such as a global positioning system (GPS) sensor, compass, accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The OFDMA uplink resource allocation device 719 may carry out or perform any of the operations and processes (e.g., processes 500 and 550) described and shown above. For example, the OFDMA uplink resource allocation device 719 may be configured to enable a two-phase uplink multi-user transmissions (UL MU), a resource request phase and a data transmission phase. The resource request phase may be triggered by the AP, where the AP may ask user devices to send a specific signal(s) within an uplink OFDMA signal if they want to have a transmit opportunity in the data transmission phase or in future UL MU transmissions. The characteristics of the signal sent by the user devices may enable the AP to identify the user devices. For example, the AP may be able to determine if any of the user devices are associated with the AP or if any of the user devices are an unassociated user device. An associated device is a device that is known to the AP and an unassociated device is a user device unknown to the AP. For example, a user device may send a code sequence in the HE-LTF in a PHY preamble. The code may be sent on a resource unit in frequency. This combination of a code sequence and frequency resource unit may have an ID, which may be referred to as resource block ID (RBID). The AP may detect the energy of the code sequence and frequency unit (e.g., RBID), which enables the AP to know the identity of the user device sending the code sequence. The AP may acknowledge to the user devices that it received the resource requests. The second phase may start with a trigger frame sent by the AP, announcing the identity of the user devices that could transmit their uplink data, and other information like the allocated resources.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments of the disclosure may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as, but not limited to, read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting, machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable. Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 500 and 550) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

In example embodiments of the disclosure there may be an access point, comprising: at least one memory that stores computer-executable instructions; and at least one processor configured to access the at least one memory, wherein the at least one processor is configured to execute the computer-executable instructions to: determine a trigger frame including one or more resource block identifications (RBIDs), each RBID being associated with a respective resource unit of one or more resource units on a communication channel; cause to send the first trigger frame to each of one or more devices; receive a power save poll (PS-poll) bit from a first device of the one or more devices on a spatial stream and a first resource unit of the one or more resource units; transmit an acknowledgment to each of the one or more user devices; transmit data buffered in the at least one processor to the first device; and receive an acknowledgment from the first device confirming receipt of the data.

Implementations may include one or more of the following features. In some implementations the spatial stream may correspond to a code from a P-matrix. The first device may be associated with the access point, and the at least one processor may be further configured to execute the computer-executable instructions to: assign a first RBID of the one or more RBIDs to the first device. The first resource unit may comprise 26 tones. The PS-Poll bit may be sent in a frame that includes a physical layer (PHY) preamble. The PHY preamble may comprise a high efficiency long training field (HE-LTF). The HE-LTF may include one or more resource blocks, and the one or more resource blocks may be identified by a particular RBID of the one or more RBIDs.

The one or more resource blocks may include a code sequence associated with the first resource unit in a frequency domain. The access point may further comprise: a transceiver in communication with the at least one processor, the transceiver being configured to transmit and receive wireless signals; and an antenna coupled to the transceiver.

In some example embodiments there may be a non-transitory computer-readable medium storing computer-executable instructions which when executed by one or more processors result in performing operations comprising: determining a trigger frame including one or more resource block identifications (RBIDs) each RBID being associated with a respective resource unit of one or more resource units on a communication channel; assigning each of the RBIDs to each of the one or more devices; causing to send the first trigger frame to each of the one or more devices; receiving a power save poll (PS-poll) bit from a first device of the one or more devices on a spatial stream and a first resource unit of the one or more resource units; transmitting an acknowledgment to each of the one or more user devices; transmitting data buffered in the at least one processor to the first device; and receiving an acknowledgment from the first device confirming receipt of the data.

The spatial stream may correspond to a code from a P-matrix. The resource unit may comprise 26 tones. The data may be transmitted in a downlink (DL) multiuser (MU) frame. The PS-Poll bit may be sent in a frame that may include a physical layer (PHY) preamble. The PHY preamble includes at least in part a high efficiency long training field (HE-LTF). The HE-LTF may include one or more resource blocks, and the one or more resource blocks may be identified by the RBID. The one or more resource blocks may include a code sequence associated with the first resource unit in a frequency domain. The device may be associated with the access point or unassociated with the access point.

There may be a method performed by an access point comprising: determining a trigger frame including one or more resource block identifications (RBIDs) each RBID being associated with a respective resource unit of one or more resource units on a communication channel; assigning each of the RBIDs to each of the one or more devices; causing to send the first trigger frame to each of the one or more devices; receiving a power save poll (PS-poll) bit from a first device of the one or more devices on a spatial stream and a first resource unit of the one or more resource units; transmitting an acknowledgment to each of the one or more user devices; transmitting data buffered in the at least one processor to the first device; and receiving an acknowledgment from the first device confirming receipt of the data.

The method may further comprise: transmitting a beacon frame before the trigger frame, wherein the beacon frame includes one or more resource block identifications (RBIDs) each of which is associated with each of one or more resource units on a communication channel.

In other embodiments there may be an access point comprising: means for determining a trigger frame including one or more resource block identifications (RBIDs), each RBID being associated with a respective resource unit of one or more resource units on a communication channel; means for causing to send the first trigger frame to each of one or more devices; means for receiving a power save poll (PS-poll) bit from a first device of the one or more devices on a spatial stream and a first resource unit of the one or more resource units; means for transmitting an acknowledgment to each of the one or more user devices; means for transmitting data buffered in the at least one processor to the first device; and means for receiving an acknowledgment from the first device confirming receipt of the data.

The spatial stream may correspond to a code from a P-matrix. The first device may be associated with the access point, and the access point may further comprise means for: assigning a first RBID of the one or more RBIDs to the first device. The first resource unit may comprise 26 tones. The PS-Poll bit may be sent in a frame that may include a physical layer (PHY) preamble. The PHY preamble may comprise a high efficiency long training field (HE-LTF). The HE-LTF may include one or more resource blocks, and the one or more resource blocks may be identified by a particular RBID of the one or more RBIDs. The one or more resource blocks may include a code sequence associated with the first resource unit in a frequency domain. The access point may further comprise: a transceiver in communication with the at least one processor, the transceiver being configured to transmit and receive wireless signals; and an antenna coupled to the transceiver.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An access point, comprising:
   at least one memory that stores computer-executable instructions; and
   at least one processor configured to access the at least one memory, wherein the at least one processor is configured to execute the computer-executable instructions to:
   generate a trigger frame including one or more resource block identifications (RBIDs), wherein each of the one or more RBIDs is associated with a respective resource unit of one or more resource units on a communication channel;
   cause to transmit the trigger frame to each of one or more devices;
   process a received a power save poll (PS-poll) bit from a first device of the one or more devices on a spatial stream and a first resource unit of the one or more resource units;
   cause to transmit an acknowledgment to each of the one or more user devices;
   cause to transmit data buffered in the at least one processor to the first device; and process a received an acknowledgment from the first device confirming receipt of the data.

2. The wireless communication device of claim 1, wherein the spatial stream corresponds to a code from a P-matrix.

3. The wireless communication device of claim 1, wherein the first device is associated with the wireless communication device, and wherein the at least one processor is further configured to execute the computer-executable instructions to:
assign a first RBID of the one or more RBIDs to the first device.

4. The wireless communication device of claim 1, wherein the first resource unit comprises 26 tones.

5. The wireless communication device of claim 1, wherein processing the PS-Poll includes processing a frame including a physical layer (PHY) preamble and the PS-Poll.

6. The wireless communication device of claim 5, wherein the PHY preamble comprises a high efficiency long training field (HE-LTF).

7. The wireless communication device of claim 6, wherein the HE-LTF includes one or more resource blocks, and the one or more resource blocks are identified by a particular RBID of the one or more RBIDs.

8. The wireless communication device of claim 7, wherein the one or more resource blocks includes a code sequence associated with the first resource unit in a frequency domain.

9. The wireless communication device of claim 1, further comprising:
a transceiver in communication with the at least one processor, the transceiver being configured to transmit and receive wireless signals; and
one or more antennas coupled to the transceiver.

10. A non-transitory computer-readable medium storing computer-executable instructions which when executed by one or more processors result in performing operations comprising:
identifying a trigger frame received from an access point on a communication channel;
causing to transmit a High Efficiency Long Training Field (HE-LTF) in response to the trigger frame wherein the HE-LTF corresponds to a power save poll (PS-Poll);
identifying a multiuser acknowledgment received from the access point;
identifying buffered data received from the access point during a downlink multiuser delivery phase; and
causing to transmit the multiuser acknowledgment in response to receiving the buffered data.

11. The non-transitory computer-readable medium of claim 10, further comprising computer-executable instructions which when executed by the one or more processors results in performing operations comprising:
encoding a 1-bit PS-Poll bit in four HE-LTFs.

12. The non-transitory computer-readable medium of claim 11, wherein the 1-bit PS-Poll bit corresponds to a notification that the non-transitory computer-readable medium is not in a power save state.

13. The non-transitory computer-readable medium of claim 11, wherein the 1-bit PS-Poll bit is sent to the access point using a spatial stream and resource unit.

14. The non-transitory computer-readable medium of claim 11, wherein the 1-bit PS-Poll bit is sent in a frame that includes a physical layer (PHY) preamble.

15. The non-transitory computer-readable medium of claim 10, wherein the HE-LTF includes one or more resource blocks, and the one or more resource blocks are identified by one or more resource block identifications (RBIDs).

16. The non-transitory computer-readable medium of claim 15, wherein the one or more resource blocks includes a code sequence associated with a first resource unit in a frequency domain.

17. The non-transitory computer-readable medium of claim 13, wherein the spatial stream corresponds to a line from a P-matrix.

18. A method comprising:
identifying a trigger frame received from an access point on a communication channel;
causing to transmit a High Efficiency Long Training Field (HE-LTF) in response to the trigger frame wherein the HE-LTF corresponds to a power save poll (PS-Poll);
identifying a multiuser acknowledgment received from the access point;
identifying buffered data received from the access point during a downlink multiuser delivery phase; and
causing to transmit the multiuser acknowledgment in response to receiving buffered data.

19. The method of claim 18, further comprising:
encoding a 1-bit PS-Poll bit in four HE-LTFs.

20. The method of claim 19, wherein the 1-bit PS-Poll bit corresponds to a notification that a device encoding the the 1-bit PS-Poll bit is not in a power save state.

* * * * *